United States Patent [19]

Koga et al.

[11] Patent Number: 4,661,555

[45] Date of Patent: Apr. 28, 1987

[54] POLYCARBONATE RESIN COMPOSITION AND PROCESS FOR ITS PRODUCTION

[75] Inventors: Shinichiro Koga, Nohgata; Katsuhisa Kohyama, Kitakyushu; Katsuyuki Sakata, Nakama, all of Japan

[73] Assignee: Mitsubishi Chemical Industries Limited, Tokyo, Japan

[21] Appl. No.: 802,448

[22] Filed: Nov. 27, 1985

[30] Foreign Application Priority Data

Nov. 28, 1984 [JP] Japan .................................. 59-250765
Mar. 4, 1985 [JP] Japan .................................... 60-42081
Apr. 19, 1985 [JP] Japan .................................... 60-83826

[51] Int. Cl.$^4$ ............................................. C08L 69/00
[52] U.S. Cl. ...................................................... 524/611
[58] Field of Search .......................................... 524/611

[56] References Cited

U.S. PATENT DOCUMENTS 4,546,172 10/1985 Kohyama et al. ................... 528/491

FOREIGN PATENT DOCUMENTS 0116336 8/1984 European Pat. Off. .

Primary Examiner—Lewis T. Jacobs
Attorney, Agent, or Firm—Oblon, Fisher, Spivak, McClelland & Maier

[57] ABSTRACT

A particulate polycarbonate resin composition which is separated from a solution of an inorganic filler-containing polycarbonate in an organic solvent at a temperature lower than the melting point of the polycarbonate, and contains an inorganic filler, said composition having a particle size distribution n of from 3 to 8 as represented by the following Rosin-Rammler distribution equation $$R = 100 \exp(-b\, D_p{}^n)$$

where R is an on-sieve amount (% by weight), $D_p$ is a particle diameter (mm), and b is a constant, the particle diameter of the 50% on-sieve weight integration being from 0.5 to 6 mm, and the bulk density being from 0.1 to 0.7 g/ml.

16 Claims, No Drawings

POLYCARBONATE RESIN COMPOSITION AND PROCESS FOR ITS PRODUCTION

The present invention relates to a polycarbonate resin composition containing an inorganic filler and process for its production. More particularly, the present invention relates to a particulate polycarbonate resin composition, which contains an inorganic filler such as a carbon fiber or carbon black and which has excellent manageability and quality and to a process for its production.

With respect to a polycarbonate resin composition containing a carbon fiber as an inorganic filler, a process is known in which a powder or pellets of polycarbonate and a carbon fiber are mixed and fed into an extruder, whereby the polycarbonate is molten, and the mixture is kneaded and extruded, the extrudate is then pelletized, and the pellets thus prepared are molded by a molding machine (Japanese Examined Patent Publication No. 30911/1976).

In this process, however, it is necessary to heat the polycarbonate to the melting point. If a carbon fiber is present, it accelerates pyrolysis of the polycarbonate, whereby a molecular weight of the polycarbonate in the resulting composition becomes lower than its original molecular weight. Further, in this case, for the purpose of a uniform dispersion of the carbon fiber in the resin, the mixture is adequately kneaded. The carbon fiber is broken by this kneading, so that its effect as a reinforcing agent is reduced, whereby a molded piece obtained by molding the pellets has an inferior mechanical strength. Accordingly, a molded part made of the pellets can not exhibit a sufficient performance. Further, the process is not adequately satisfactory for the reason that in incorporation by the extruder, a great deal of electric power is consumed for heating the polycarbonate to the melting point and for kneading the mixture. If a large amount of the carbon fiber, for instance, more than 30% by weight relative to the polycarbonate, is incorporated, it is difficult to smoothly feed the mixture of the polycarbonate with the carbon fiber into the extruder. Further, as the viscosity of the polycarbonate resin in a molten state is very high unlike a thermoplastic resin such as polyethylene, polyvinylchloride or polystyrene, it is technically difficult to uniformly incorporate the carbon fiber by the extruder under heating condition.

With respect to a polycarbonate resin composition containing carbon black, there have been known pellets prepared by a process in which a powder or pellets of polycarbonate and carbon black are mixed and fed into an extruder, the polycarbonate is molten, and the mixture is kneaded, extruded and pelletized, and the flakes prepared by a process in which carbon black is added to and mixed with a solution of polycarbonate in an organic solvent, and the mixture is stirred under heating in a kneader to evaporate the organic solvent (Japanese Examined Patent Publication No. 10408/1962). In this case, however, there will be the same problems as in the case where carbon fiber is incorporated. Further, when the composition contains carbon black, fine carbon black powder particles are likely to be scattered, and such a composition is inconvenient in handling. Further, the particle size distribution of the composition is so wide that it is not proper to feed the composition directly into a molding machine such as an injection molding machine as it is. Namely, it is necessary to pelletize it by melt extrusion by using an extruder, whereby the process is prolonged. Further, in such a case, as mentioned above, the molecular weight of the polycarbonate lowers.

The present inventors have conducted extensive researches on the polycarbonate resin composition containing an inorganic filler, and as a result, have found that when a certain specific method is employed, it is possible to produce a particulate resin composition having a uniform particle size which may contain an inorganic filler in a wide range of from a low proportion without requiring motive power or heat required in the process using an extruder and a kneader, and that as said composition can be fed directly into an injection molding machine as it is, it is possible to minimize the reduction of the molecular weight of the polycarbonate contained in a molded piece and the reduction of the mechanical strength due to breakage of the fibrous filler. The present invention has been accomplished based on the discoveries.

Namely, it is an object of the present invention to provide, in an industrially advantageous manner, a particulate polycarbonate resin composition which uniformly contains an inorganic filler and which has excellent manageability and quality.

The present invention provides a particulate polycarbonate resin composition having a particle size distribution n of from 3 to 8 as represented by the following Rosin-Rammler distribution equation:

$$R = 100 \exp(-b\, Dp^n)$$

where R is an on-sieve amount (% by weight), Dp is a particle diameter (mm), and b is a constant, the particle diameter of the 50% on-sieve weight integration (Dp-50) being from 0.5 to 6 mm, and the bulk density being from 0.1 to 0.7 g/ml.

This particulate polycarbonate resin composition can be prepared by heating a methylene chloride solution of an inorganic filler-containing polycarbonate to evaporate methylene chloride therefrom, while maintaining the solution in an oil-in-water type suspended state.

Now, the present invention will be described in detail.

The particulate polycarbonate resin composition of the present invention is separated from a PCM solution (a methylene chloride solution of polycarbonate) at a temperature lower than the melting point of the polycarbonate resin. If the polycarbonate resin composition containing an inorganic filler is exposed to a high temperature, its molecular weight disadvantageously lowers. The composition has the value of the above-mentioned n of from 3 to 8, preferably from 3 to 6. It is not disadvantageous that the value is high. However, it is difficult to industrially produce a polycarbonate resin composition having so high the value of n.

On the other hand, if the value is too low, it is impossible to obtain the effects of the present invention.

The shape of the particulate polycarbonate resin may be granular or spindly as mentioned below, with Dp50 being within a range of from 0.5 to 6.0 mm, preferably from 1 to 4 mm.

If the particle size of the particulate product is too small, particles are likely to be scattered during handling. On the other hand, if the particle size is too large, the screw of an extruder hardly shows good bite into the particles. Further, when the particulate products are employed for a masterbatch, if their particles are too large and the degree of dilution is high, the dispersion of the inorganic fillers tends to be poor. The bulk density is from 0.1 to 0.7 g/ml, preferably from 0.2 to 0.5 g/ml. If the bulk density is too low, the screw of a molding machine shows poor bite into the particles. A particulate product having such a low bulk density is disadvantageous also from the aspects of packing, transportation and feeding into a hopper. On the other hand, it is difficult to industrially produce a product having a bulk density of higher than 0.6 g/ml.

As the polycarbonate resin used in the present invention, there may be mentioned a polycarbonate resin obtained by the interfacial polymerization or solution polymerization of a dihydroxydiaryl compound represented by the general formula:

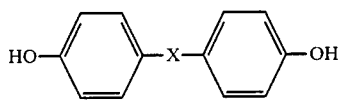

where X is a divalent group represented by

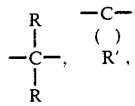

—O—, —S—, —SO— or —SO$_2$—, where R which may be the same or different, is a hydrogen atom, a monovalent hydrocarbon group or a halogen atom, and R' is a divalent hydrocarbon group, and the aromatic rings may be substituted by halogen atoms or monovalent hydrocarbon groups, with phosgene or a bischloroformate of the dihydroxydiaryl compound in the presence of methylene chloride and an acid-binding agent such as alkali metal hydroxide or pyridine.

As specific examples of the dihydroxydiaryl compound of the formula I, there may be mentioned bis(hydroxyaryl)alkanes such as bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl)phenyl methane, 2,2-bis(4-hydroxy-3-methylphenyl)propane, 1,1-bis(4-hydroxy-3-tert.butylphenyl)propane, 2,2-bis(4-hydroxy-3-bromophenyl)propane, 2,2-bis(4-hydroxy-3,5-dibromophenyl)propane, 2,2-bis(4-hydroxy-3,5-dichlorophenyl)propane; bis(hydroxy aryl)cycloalkanes such as 1,1-bis(4-hydroxyphenyl)cyclopentane or 1,1-bis(hydroxyphenyl)cyclohexane; dihydroxydiaryl ethers such as 4,4'-dihydroxydiphenyl ether or 4,4'-dihydroxy-3,3'-dimethyldiphenyl ether; dihydroxydiaryl sulfides such as 4,4'-dihydroxydiphenyl sulfide or 4,4'-dihydroxy-3,3'-dimethyldiphenyl sulfide; dihydroxydiaryl sulfoxides such as 4,4'-dihydroxydiphenyl sulfoxide or 4,4'-dihydroxy-3,3'-dimethyldiphenyl sulfoxide; or dihydroxydiaryl sulfones such as 4,4'-dihydroxydiphenyl sulfone or 4,4'-dihydroxy-3,3'-dimethyldiphenyl sulfone.

These compounds may be used alone or in combination as a mixture of two or more different kinds. Further, these compounds may be used in combination with other compounds e.g. a dihydroxy compound such as hydroquinone, resorsinol or 4,4'-dihydroxydiphenyl, a halide of dicarboxylic acid such as terephthal chloride or isophthaloyl chloride, or a diamine such as piperazine or dipiperazyl.

As the organic solvent, there may be mentioned methylene chloride, and it may contain at most about 10% by weight of other solvent such as chloroform, carbon tetrachloride, 1,2-dichloroethane, 1,1,2-trichloroethane, tetrachloroethane or chlorobenzene.

The resin concentration in the organic solvent solution is from 0.5 to 30% by weight, preferably from 2 to 20% by weight. If the concentration is too high, additives are hardly dispersed. On the other hand, if the concentration is too low, the productivity is poor.

As the inorganic compound type filler, there may be employed a substance which does not substantially dissolve in water or in the organic solvent. As a powdery inorganic filler, there may be mentioned an inorganic filler having a particle size of from 10 m$\mu$m to 1 mm. As a specific example, e.g. carbon black, silica, alumina, aluminosilicate, titania, magnesia, hydrozincite, calcium carbonate, barium carbonate, aluminum sulfate, barium sulfate, gypsum, calcium silicate, talc, kaoline, clay, bentonite, diatomaceous earth, silica stone, quartz, pumice, feldspar, glass powder, glass beads or mica may be mentioned.

Further, as a fibrous inorganic filler, there may be mentioned an inorganic filler having a diameter of from 10 m$\mu$m to 100 $\mu$m, a length of from 10 $\mu$m to 10 mm, and l/D of from 10 to 1000. As a specific example, carbon fiber, glass fiber, potassium titanate fiber, alumina fiber, asbestos or rock wool may be mentioned.

Among these inorganic fillers, carbon fiber and carbon black are particularly preferably employed.

As carbon fibers, there may be employed various known carbon fibers which are made of Rayon type, acrylonitrile type, pitch type or lignine type material as the starting material.

Further, such carbon fibers having a length of at most 20 mm may be employed. If the carbon fibers are too long, a stable operation is likely to be hindered, e.g. by a trouble that the carbon fibers are caught on stirring vanes.

As specific examples of the carbon fibers, there may be mentioned carbon fibers having a fiber length of at most 10 mm such as chopped fibers (fiber length of from 6 to 3 mm) and milled fibers (average fiber length of about 0.2 mm). A bundling agent may be applied to carbon fibers. However, a bundling agent may be omitted to avoid its cost.

As the carbon black, there may be employed various known carbon blacks such as channel black, acetylene black, carbon black for incorporating into a resin produced by a furnace process, conductive carbon black, and by-produced carbon black (carbon black which is by-produced when a hydrocarbon such as heavy oil or ethylene bottom oil is partially oxidized in the presence of an oxygen and a steam to prepare a carbon monoxide gas and hydrogen gas). Further, in the present invention, meaning of carbon black includes graphite.

As the carbon black to be incorporated into a resin, there may be mentioned, for instance, carbon black for coloring such as #2300, #950, MCF 88B, MA 600, MA 100, #45, #40, #4000B or #3500B (manufactured by Mitsubishi Chemical Industries, Ltd.).

As a conductive carbon black, there may be mentioned, for instance, Kedchen Black (tradename, manufactured by AKZO CHEMIE, Netherlands), etc.

Further, a mixture thereof may be employed.

Now, the process the producing a particulate polycarbonate resin composition will be described in detail.

Charging

There is no particular restriction with respect to mixing sequence of the inorganic filler, the organic solvent solution of polycarbonate and water. For example there may be mentioned a method in which an inorganic filler is mixed with a solution of polycarbonate resin inorganic solvent, and the mixture is then dispersed in water, or a method in which an inorganic filler is suspended in water, and an organic solvent solution of polycarbonate resin is added to the suspension to make the inorganic filler immigrate to the organic solvent solution, or a method in which the three ingredients are charged simultaneously, or a method in which an inorganic filler is dispersed in warm water and then a methylene chloride solution of the polymer is charged to the dispersion.

Stirring

Stirring is conducted in a usual agitation tank.

A baffle may or may not be equipped. The stirring may be conducted by using a stirrer with mixing vanes such as anchor vanes. However, the stirring is preferably conducted at a relatively high speed with vanes of a turbine, fan turbine or faudler.

A peripheral speed of the tip of each vane is preferably at least 1.0 m/sec. If the peripheral speed of the tip of the vane is low, the size of a particulate product is disadvantageously large.

Distillation

The solvent is most readily distilled off by heating with a heating jacket of the agitation tank. The heating is preferably conducted within a internal temperature range of from the boiling point of the organic solvent to a temperature which is higher by 10° C. than the boiling point of the organic solvent. Even if the heating is conducted at a temperature of higher than the temperature which is higher by 10° C. than the boiling point of the organic solvent, there is no substantial problem. However, the heating may as well be conducted at a temperature of up to a temperature which is higher by 20° C. than the boiling point of the organic solvent lest the bulk density of an obtained particle should be low. Accordingly, if a methylene chloride solution (boiling point: about 40° C.) is employed, the heating temperature is preferably from 40° to 60° C., more preferably from 40° to 50° C.

Particle forming

When the operation is conducted under the above-mentioned condition, inorganic fillers are agglomerated by the polymer as a bonding medium. Particulate products of a uniform shape are obtainable by this operation. If the filler is fibrous, the shape of the particulate product varies depending upon the fiber length of the filler. Usually, if the fiber length is at most 1 mm, granules having an average particulate diameter of the 50% on-sieve weight integration (Dp-50) of from 0.5 to 6 mm is obtainable, in which the fibers are agglomerated as being coated with the polymer.

Further, if the fiber length is more than 1 mm, a spindle-shaped product having a length of from 5 to 10 mm, a diameter of from 0.5 to 6 mm and Dp-50 of from 0.5 to 6 mm is usually obtainable, in which the fibers are agglomerated in a certain amount and in a certain direction as being coated with the polymer.

Ratio of the inorganic filler to the polycarbonate resin

The weight ratio of inorganic filler/polycarbonate is at most 95/5, preferably from 5/95 to 90/10.

Even if the inorganic filler is less than 5%, there is no technical problem. However, a composition containing less than 5% of the inorganic filler has no substantial merit for use as a masterbatch.

If inorganic filler/polycarbonate is more than 95/5, the adhesive effect of the polycarbonate to the inorganic filler will be inadequate, whereby it is impossible to form a particulate product comprising the inorganic filler. In the process of the present invention, even if the amount of the inorganic filler exceeds 10%, a composition is readily obtainable without the above-mentioned problem.

Concentration of the filler-containing particulate resin product relative to water The concentration of the filler-containing particulate resin product relative to water is at most 40% by weight, preferably from 0.1 to 30% by weight. If the concentration is higher than 40% by weight, it is impossible to obtain a particulate product having a good shape. If the concentration is low, there is no particular problem in performing the operation. However, it is disadvantageous that the treating amount will be little.

Operation

The present invention may be performed by a batch process or a continuous process.

With respect to the continuous process, there has been a process which comprises continuously supplying the methylene chloride solution of the polycarbonate resin to a particle-forming vessel, heating it while maintaining it in a suspended state in water to evaporate methylene chloride and to form an aqueous slurry containing polycarbonate resin particles, subjecting at least a part of the resulting aqueous slurry withdrawn from the particle-forming vessel and containing the polycarbonate resin particles to wet pulverization treatment and recycling the treated polycarbonate resin particles to the particle-forming vessel (Japanese Patent Application Nos. 7971/1983 and 221818/1983).

According to this process, it is possible to readily prepare polycarbonate resin particles having a bulk density of from 0.3 to 0.7 g/ml, a value n of from 3 to 8 as represented by the following Rosin-Rammler distribution equation:

$$R = 100 \exp(-b \, Dp^n)$$

and a particle diameter of the 50% on-sieve weight integration of from 0.5 to 6 mm. As another process for producing polycarbonate resin particles of the present invention, there may be mentioned a process in which powders and particles having a broad particle size distribution, which is obtained by the method which comprises supplying the same methyl chloride solution of the polycarbonate resin as mentioned above and water to a kneader equipped with a jacket having e.g. sigma or Z type vanes, gelating the mixture while evaporating the methyl chloride, followed by pulverization, or powders and particles of the polycarbonate resin having a broad particle size distribution n of at most 3 according to Rosin-Rammler distribution equation, which is prepared by another method, are sieved to eliminate coarse and fine particles. Like the polycarbonate resin particles obtained by the former process, the polycarbonate resin particles obtained by this process have excellent properties as materials for injection molding and extrusion molding.

Now, the present invention will be described in further detail with reference to Examples. However, it should be understood that the present invention is not restricted to these specific Examples.

In the Examples, "parts" means "parts by weight".

The particle size is represented by a 50% on-sieve weight integration (median diameter: Dp-50), and the particle size distribution is represented by the value n in the following Rosin-Rammler distribution equation disclosed on page 973 in "Chemical Engineering Handbook, 4th edition" published on Oct. 25, 1978 by Maruzen Co., Ltd.

$$R = 100 \exp(-b\, Dp^n)$$

where R is an on-sieve amount (% by weight), Dp is a particle diameter (mm), and b is a constant.

Particle Forming Example 1

200 parts of purified polycarbonate (polyester of carbonic acid) resin powder (average moleculare weight: 21,000) obtained by reacting 4,4'-dioxydiphenyl-2,2-propane (bisphenol A) with phosgene in the presence of methylene chloride and an aqueous solution of sodium hydroxide, was dissolved in 1800 parts of methylene chloride. 2000 parts of the methylene chloride solution of polycarbonate, 18,000 parts of water and 800 parts of carbon fibers [obtained by cutting HTA-7 (tradename) manufactured by Toho Rayon Co., Ltd., in a length of 0.5 mm, followed by the desizing with a solvent] were fed into a 25 liter agitation tank provided with a jacket, the mixture was stirred with a stirrer having two-rows of four fan turbine vanes at a rotational speed of 240 rpm for good dispersion. Then, warm water having a temperature of at least 40° C. was passed through the jacket for heating, and evaporated methylene chloride was withdrawn out of the system through a gas distillation tube, and concentrated and collected. Upon expiration of about 30 minutes, i.e. when the evaporation of the methylene chloride almost terminated, the reaction mixture was filtered through a wire gauze to obtain particulate product. The particulate product thus obtained was granules comprising of 80% of carbon fibers and 20% of the polycarbonate, which had diameters of from 2 to 5 mm and uniform shape.

According to the measurement after drying, the particulate product had a bulk density of 0.43 g/ml, an average particle size (Dp-50) of 2.3 mm and a particle size distribution (value n) of 4.0.

Hereinafter, the polycarbonate resin particles will be referred to as Particle A.

Particle Forming Example 2

A particulate product was obtained in the same manner as in Particle Forming Example 1 except that 800 parts of carbon black [#40 (brand) manufactured by Mitsubishi Chemical Industries, Ltd., powders uniformly shaped (particle diameter 20 μm)] was employed instead of the carbon fibers of Particle Forming Example 1.

The particulate product thus obtained was particles comprising of 80% of carbon fibers and 20% of the polycarbonate, which had diameters of from 0.5 to 5 mm. According to the measurement after drying, the particulate product had a bulk density of 0.38 g/ml, an average particle size (Dp-50) of 2.7 mm and a particle size distribution (value n) of 4.2.

Hereinafter, the polycarbonate resin particles will be referred to as Particle B.

Particle Forming Example 3

As a substitute for the carbon fibers of Particle Forming Example 1, 2000 parts of a polycarbonate resin powder having an average particle diameter of 0.8 mm and 18,000 parts of water was fed into a 25 liter agitation tank provided with a jacket, the mixture was stirred with a stirrer having two-rows of four fan turbine vanes at a rotational speed of 240 rpm to well disperse the polycarbonate resin powder in water. Then, warm water was passed through the jacket to maintain the internal temperature at 43° C. To the dispersion, a polymer solution of 3000 parts of the same polycarbonate resin powders as mentioned above dissolved in 27,000 parts of a methylene chloride solution is fed at a rate of 8 liter/hr by means of a pump, whereby the particle forming was conducted while coating the resin powders with the resin. Evaporated methylene chloride was withdrawn out of the system through a gas distillation tube, and concentrated and collected. About 30 minutes after completion of feeding of the polymer solution, i.e. when the vaporation of the methylene chloride almost terminated, the reaction mixture was filtered through a wire gauze to obtain particulate product. The particulate product thus obtained was particles having diameters of from 0.5 to 5 mm.

According to the measurement after drying, the particulate product had a bulk density of 0.60 g/ml, an average particle size (Dp-50) of 2.7 mm and a particle size distribution (value n) of 4.2.

Hereinafter, the polycarbonate resin particles will be referred to as Particle C.

Particle Forming Example 4 (Comparative Example)

The same solution as the 15% solution of the polycarbonate resin employed in Particle Forming Example 1 was fed into a kneader (capacity: 40 liter) having Z-type vanes and equipped with a jacket at a rate of 20 liter/hr to prepare polycarbonate resin particles while evaporating methylene chloride. According to the measurement after drying, the particulate product had a bulk density of 0.72 g/ml, an average particle size (Dp-50) of 0.80 mm and a particle size distribution (value n) of 1.

4000 parts of the particles and 1000 parts of carbon fibers [HTA-C6VS (tradename) manufactured by Toho Rayon Co., Ltd., fiber length 6 mm] were dryblended, the blend was formed into pellets having a diameter of 2.5 mm and length of 2.5 mm a 40 mm extruder.

Hereinafter, the pellets will be referred to as Particle D.

Particle Forming Example 5 (Comparative Example)

4000 parts of the same particles as the polycarbonate particles employed in Particle Forming Example 4 and 1000 parts of carbon black [#40 (brand) manufactured by Mitsubishi Chemical Industries, Ltd., uniformly shaped powder (particle diameter: 20 mμm)] were dryblended, the blend was formed into pellets having a diameter of 2.5 mm and a length of 2.5 mm with a 40 mmφ extruder.

The pellets will be referred to as Particle E. Particle Forming Example 6

18 liters of water and 800 g of carbon fibers [obtained by cutting HTA-7 (tradename) manufactured by Toho Rayon Co., Ltd., in a length of 0.5 mm, followed by the desizing with a solvent] were fed into a 25 liter agitation tank (SUS-316) provided with a jacket, the mixture was stirred with the stirrer having two-rows of four fan turbine vanes at a rotational speed of 240 rpm for good dispersion, warm water having a temperature of at least 43° C. was passed through the jacket to maintain the internal temperature at 43° C.

Then, 3200 parts of a polycarbonate resin was dissolved in 28,800 parts of a methylene chloride solution, and the solution was fed into a particle-forming vessel with a pump at a rate of 6 liter/hr, whereby the particle forming was conducted while evaporating of the methylene chloride. Evaporated methylene chloride was withdrawn out of the system through a gas distillation tube, and concentrated and collected. Upon expiration of about 30 minutes, i.e. when the evaporation of the methylene chloride almost terminated, the reacting mixture was filtered through a wire gauze to obtain a particulate product. The particulate product thus obtained was granules comprising of 80% of carbon fibers and 20% of the polycarbonate resin, which had diameters of from 2 to 4 mm and uniform shape. According to the measurement after drying, the particulate product had a bulk density of 0.35 g/ml, an average particle size (Dp-50) of 2.6 mm and a particle size distribution (value n) of 3.6.

Hereinafter, the polycarbonate resin particles will be referred to as Particle F.

Particle Forming Example 7

18 liters of water and 800 g of carbon fibers are fed into an agitation tank and the mixture was maintained at 43° C. in the same manner as in Particle Forming Example 6.

Then, 5330 parts of 10% by weight of a methylene chloride solution of the polycarbonate was fed into the agitation tank, then particulate product was obtained in the same manner as in Particle Forming Example 6. The particulate product thus obtained was granules comprising of 60% of carbon fibers and 40% of the polycarbonate resin, which had diameters of from 2 to 5 mm and uniform shape. According to the measurement after drying, the particulate product has a bulk density of 0.45 g/ml, an average particle size (Dp-50) of 2.5 mm and a particle size distribution (value n) of 4.0.

Hereinafter, the polycarbonate resin particles will be referred to as Particle G.

Particle Forming Example 8

18 liters of water and 800 g of carbon fibers were fed into an agitation tank and the mixture was maintained at 43° C., in the same manner as in Particle Forming Example 6.

Then, 12,000 parts of 10% by weight of methylene chloride solution of the polycarbonate was fed into the agitation tank, and then a particulate product was obtained in the same manner as in Particle Forming Example 6. The particulate product thus obtained was granules comprising of 40% of carbon fibers and 60% of the polycarbonate resin, which had diameters of from 2 to 5 mm and uniform shape. According to the measurement after drying, the particulate product had a bulk density of 0.39 g/ml, an average particle size (Dp-50) of 2.6 mm and an particle size distribution (value n) of 3.8.

Hereinafter, the polycarbonate resin particles will be referred to as Particle H.

Particle Forming Example 9

A particulate product was obtained in the same manner as in Particle Forming Example 6 except that 800 g of carbon black (manufactured by Mitsubishi Chemical Industries, Ltd.) was employed instead of carbon fibers. The particulate product thus obtained was composed of 20% of carbon black and 80% of the polycarbonate. According to the measurement after drying, the particulate product had a bulk density of 0.36 g/ml, an average particle size (Dp-50) of 2.9 mm and a particle size distribution (value n) of 5.1.

The particles will be referred to as Particle I.

Particle Forming Example 10

A particulate products was obtained in the same manner as in Particle Forming Example 7 except that Z0 carbon black was employed instead of the carbon fibers.

The particlulate product thus obtained was composed of 60% of carbon black and 40% of the polycarbonate resin. According to the measurement after drying, the particulate product had a bulk density of 0.42 g/ml, an average particle size (Dp-50) of from 2.0 to 5.0 mm and a particle size distribution (value n) of 5.5.

Hereinafter, the polycarbonate resin particles will be referred to as Particle J.

Particle Forming Example 11

A particulate products was obtained in the same manner as in Particle Forming Example 8 except that carbon black was employed instead of the carbon fibers. The particulate product thus obtained was composed of 40% of carbon black and 60% of the polycarbonate resin.

According to the measurement after drying, the particulate product had a bulk density of 0.43 g/ml, an average particle size (Dp-50) of from 2.5 to 5.5 mm and a particle size distribution (value n) of 5.5.

Hereinafter, the polycarbonate resin particles will be referred to as Particle K.

The products of Particle Forming Examples 1 to 11 (Particles A to K) are shown Table 1.

Particle Forming Example 12

600 ml of water, 94 g of 8% of a methylene chloride solution of the polycarbonate and 30 g of carbon fiber [M-104T manufactured by Kureha Chemical Industry Co., Ltd. (fiber length 0.5 mm, fiber diameter 18μm)] were charged into a 1 liter separable flask provided with a jacket, the mixture was stirred by a stirrer having two-rows of four turbine vanes at a rotational speed of 600 rpm for good dispersion. Then, warm water having a temperature of from 40° to 60° C. was passed through the jacket for heating, and evaporated methylene chloride was withdrawn out of the system through a gas distillation tube, and concentrated and collected. Upon expiration of about 30 minutes, i.e. when the evaporation of the methylene chloride almost terminated, the reaction mixture was filtered through a wire gauze to obtain particulate product. The particulate product thus obtained was particles comprising of 80% of carbon fibers and 20% of the polycarbonate, which had diameters of from 2 to 5 mm.

Accoridng to the measurement after drying, the particulate product had a bulk density of 0.51 g/ml and a particle size distribution (value n) of 5.0.

Particle Forming Example 13

600 ml of water, 40 g of 5% of a methylene chloride solution of the polycarbonate and 8 g of carbon fibers [C-103T manufactured by Kureha Chemical Industry Co., Ltd. (fiber length 3 mm, fiber diameter 18 μm)] were charged into a 1 liter separable flask provided with a jacket, the mixture was stirred with a stirrer having two-rows of four fan tubrine vanes at a rotational speed of 600 rpm for good dispersion. Then, warm water having a temperature of from 40° to 60° C. was passed through the jacket for heating, and evaporated methylene chloride was withdrawn out of the system through a gas distillation tube, and concentrated and collected. Upon expiration of about 30 minutes, i.e. when the evaporation of the methylene chloride almost terminated, the reaction mixture was filtered through a wire gauze to obtain particulate product. The particulate product thus obtained was a spindle-shaped product comprising 80% of carbon fibers and 20% of the polycarbonate, which had diameters of from 2 to 3 mm and a fiber length of 6 mm. According to the measurement after drying, the particulate product had a bulk density of 0.15 g/ml and a particle size distribution (value n) of 3.1.

EXAMPLE 1

Particle F was employed for dryblending with polycarbonate particles to obtain a blend having a carbon fiber concentration of 20% by weight. The blend was employed as a starting material for molding test pieces for tensile strength, bending and Izod impact tests by means of a vent type extrusion molding machine (N-100B II V manufactured by Japan Steel Works, Ltd.). The molding was conducted under the conditions of resin temperature of 300° C., injection for 10 sec and cooling for 25 sec. The tensile strength, extension, bend strength, bend modulus and Izod impact value of the molded pieces thus obtained were measured. The results are shown in Table 2.

During the handling for the injection molding, particles were not scattered, and yet the screw of an extruder showed good bite into the particles. As shown in Table 2, the molded pieces thus obtained showed less reduction of the molecular weight than the molded pieces which were prepared by molding pellets obtained by kneading by an extruder. Further, as the carbon fibers in the molded pieces of the present invention suffer no breakage due to the kneading by an extruder, it has a length of as long as 0.35 mm (the length of the carbon fibers in the molded pieces obtained by a conventional technique is 0.20 mm), whereby the mechanical properties of the molded pieces increased by 30% in the tensile strength and bend strength as compared with the conventional products. Further, the surface appearance of the molded pieces were glossy.

EXAMPLE 2

Particle I was dryblended with polycarbonate particles in the same manner as in Example 1 to obtain a blend having a carbon black concentration of 20% by weight. Then, the mechanical properties of the particulate product thus obtained were measured. The results are shown in Table 2. Like Particle F, during the injection molding, particles were not scattered, and yet the screw of an extruder showed good bite into the particles. As shown in Table 2, the molded pieces thus obtained showed less reduction of the molecular weight than the (conventional) molded pieces which were prepared by molding pellets obtained by kneading with an extruder.

Further, as shown in Table 2, the mechanical properties of the molded piece were preferable.

COMPARATIVE EXAMPLE 1

Particle D was employed to form test pieces in the same manner as in Example 1. Whereas the manageability of the test pieces was good, the molecular weight was reduced by heat deterioration during the melt pelletizing by an extruder. Further, as the carbon fibers in the molded pieces were short (0.20 mm), the tensile strength and the bend strength were reduced. The surface appearance of the molded pieces was not glossy. The molecular weight and mechanical properties of the molded products are shown in Table 2.

COMPARATIVE EXAMPLE 2

Particle E was employed to form test pieces in the same manner as in Example 1. Whereas the manageability of the test pieces was good, the molecular weight was reduced by heat deterioration during the melt pelletizing by an extruder. The molecular weight and mechanical properties of the molded pieces are shown in Table 2.

EXAMPLE 3

With respect to a blend obtained by dryblending 1250 parts of Particle A and 3750 parts of Particle C, particles were not scattered during the handling, and yet the screw of an extruder showed good bite into the particles. Like Example 1, the molecular weight, mechanical properties and surface appearance of the molded pieces were satisfactory and yet carbon fibers in the molded pieces had a fiber length of as long as 0.33 mm. The results are shown in Table 2.

EXAMPLES 4 and 5

Molded test pieces were prepared in the same manner as in Example 3 except that Particle G and Particle H were employed instead of Particle A, respectively. Carbon fibers had fiber length of 0.36 mm and 0.33 mm, respectively. The results are shown in Table 2.

EXAMPLE 6

A blend obtained by dryblending 1250 parts of Particle B and 3750 parts of Particle C was employed to form test pieces in the same manner as in Example 1. Particles were not scattered during the handling, and yet the screw of an extruder showed good bite into the particles. The molecular weight and mechanical properties of the molded pieces are shown in Table 2.

EXAMPLES 7 and 8

Molded test pieces were prepared in the same manner as in Example 6 except that Particle J and Particle K were employed instead of Particle C, respectively. The results are shown in Table 2.

TABLE 1

| Polycarbonate particles | A | B | C | D | E | F | G | H | I | J | K |
|---|---|---|---|---|---|---|---|---|---|---|---|
| Kind of inorganic filler | CF | CB | — | CF | CB | CF | CF | CF | CB | CB | CB |

TABLE 1-continued

| Polycarbonate particles | A | B | C | D | E | F | G | H | I | J | K |
|---|---|---|---|---|---|---|---|---|---|---|---|
| Concentration of inorganic filler (%) | 80 | 80 | — | (pellets) | (pellets) | 20 | 60 | 40 | 20 | 60 | 40 |
| Bulk density (g/ml) | 0.43 | 0.38 | 0.60 | | | 0.35 | 0.45 | 0.38 | 0.36 | 0.42 | 0.43 |
| Average particle diameter (Dp-50) (mm) | 2.3 | 2.7 | 2.7 | | | 2.6 | 2.5 | 2.6 | 2.9 | 2.0-5.0 | 2.5-5.5 |
| Particle size distribution (value of n) | 4.0 | 4.2 | 4.2 | | | 3.6 | 4.0 | 3.8 | 5.1 | 5.5 | 5.5 |

CF: carbon fibers
CB: carbon black

TABLE 2

| | Example 1 | Example 2 | Comparative Example 1 | Comparative Example 2 | Example 3 | Example 4 | Example 5 | Example 6 | Example 7 | Example 8 |
|---|---|---|---|---|---|---|---|---|---|---|
| Molecular weight of molded piece | 20,200 | 20,000 | 18,800 | 18,500 | 19,900 | 20,100 | 20,200 | 19,600 | 19,900 | 19,800 |
| Starting material for dry blend | Particle F | Particle I | Particle D | Particle E | Particle A Particle C | Particle G Particle C | Particle H Particle C | Particle B Particle C | Particle J Particle C | Particle K Particle C |
| Kind of inorganic filler | CF | CB | CF | CB | CF | CF | CF | CB | CB | CB |
| Concentration of inorganic filler in molded piece | 20 | 20 | 20 | 20 | 20 | 20 | 20 | 20 | 20 | 20 |
| Mechanical properties | | | | | | | | | | |
| Tensile | | | | | | | | | | |
| Breaking strength (kg/cm$^2$) | 1,290 | 650 | 960 | 590 | 1,250 | 1,270 | 1,230 | 630 | 650 | 650 |
| Extension (%) | 4.5 | 10.3 | 3.1 | 10.3 | 4.4 | 4.3 | 4.4 | 10.5 | 10.3 | 10.4 |
| Bend | | | | | | | | | | |
| Strength (kg/cm$^2$) | 1,800 | 950 | 1,400 | 930 | 1,760 | 1,820 | 1,800 | 960 | 950 | 950 |
| Modulus (kg/cm$^2$) | 88,200 | 31,000 | 86,000 | 29,800 | 85,900 | 88,400 | 86,900 | 31,000 | 29,900 | 30,000 |
| Izod impact strength | | | | | | | | | | |
| $\frac{1}{2}''$ (kg · cm/cm) | 9.1 | 4.3 | 9.0 | 4.1 | 9.1 | 9.1 | 9.2 | 4.4 | 4.3 | 4.3 |
| $\frac{1}{8}''$ (kg · cm/cm) | 10.8 | 3.9 | 12.1 | 3.7 | 10.4 | 10.6 | 10.4 | 3.6 | 3.8 | 3.8 |

CF: carbon fiber
CB: carbon black

EXAMPLE 9

600 ml of water, 75 g of 10% of a methylene chloride solution of the polycarbonate and 30 g of talc (average particle diameter: 5 μm) were charged into a 1 liter separable flask provided with a jacket, the mixture was stirred with a stirrer having two-rows of four fan turbine vanes at a rotational speed of 400 rpm for good dispersion. Then, warm water having a temperature of 45° C. was passed through the jacket for heating, and evaporated methylene chloride was withdrawn out of the system through a gas distillation tube, and concentrated and collected. Upon expiration of about 30 minutes, i.e. when the evaporation of the methylene chloride almost terminated, the reaction mixture was filtered through a wire gauze to obtain particulate product. The particulate product thus obtained was composed of 80% of talc and 20% of the polycarbonate, which had a diameter of from 0.5 to 3 mm.

According to the measurement after drying, the particulate product had a bulk density of 0.4 g/ml. 25 parts of the particulate product and 75 parts of pellets of polybutylene terephthalate were dryblended and the blend was molded by means of an extrusion molding machine (Micromate JSW J5S model, manufactured by Japan Steel Works, Ltd.). The dryblended product showed a good bite from a hopper. The resulting molded products were uniform in quality without spots of talc.

EXAMPLE 10

600 ml of water, 320 g of 8% by weight of a methylene chloride solution of the polycarbonate and 60 g of talc (average particle diameter: 5μm) are charged into a 1 liter separable flask provided with a jacket, and the mixture was stirred with a stirrer having two-rows of four fan turbine vanes at a rotational speed of 600 rpm for good dispersion. Then, warm water having a temperature of 45° C. was passed through the jacket for heating, and evaporated methylene chloride was withdrawn out of the system through a gas distillation tube, and concentrated and collected.

Upon expiration of about 30 minutes, i.e. when the evaporation of the methylene chloride almost terminated, the reaction mixture was filtered through a wire gauze to obtain a particulate product. The particulate product thus obtained was composed of 70% of talc and 30% of the polycarbonate, which had diameters of from 0.5 to 3 mm. According to the measurement after the drying, the particulate product had a bulk density of 0.6 g/ml.

EXAMPLE 11

A particulate product was obtained in the same manner as in Example 10 except that 600 ml of water, 160 g of 8% by weight of a methylene chloride solution of the polycarbonate and 30 g of talc were employed. The particulate product thus obtained was composed of 40% of talc and 60% of the polycarbonate.

According to the measurement after drying, the particulate product had a bulk density of 0.60 g/ml. Like Example 10, the molded products made of the blend of the particulate product were preferable.

EXAMPLE 12

600 ml of water, 100 g of 8% of a methylene chloride solution of the polycarbonate and 32 g of glass fibers (diameter: 13 μm, length: 2 mm) were charged into a 1 liter separable flask provided with a jacket, the mixture was stirred with a stirrer having two-rows of four fan turbine vanes at a rotational speed of 600 rpm for good dispersion. Then, warm water having a temperature of 35° C. was passed through the jacket and a temperature of warm water of the jacket was gradually increased. Evaporated methylene chloride was withdrawn out of the system through a gas distillation tube, and concentrated and collected. After 25 minutes from the start of heating, i.e. when internal temperature reached 60° C., the heating was stopped, the reaction mixture was filtered through a wire gauze to obtain a particulate product. A particulate product thus obtained, in which the glass fibers were oriented in the same direction, was a spindle-shaped product and had a length of about 4 mm and a diameter of about 1.5 mm.

With respect to the composition of the present invention, there is no problem that powders are dispersed or scattered during the handling, and yet the composition has good fluidity in a silo or a hopper. If the particles obtained in the present invention are employed for a masterbatch, the masterbatch will have a high concentration of filler so that the degree of dilution can be enlarged, whereby it is possible to reduce the cost.

Further, if the composition is employed for molding as it is, it is possible to readily obtain a product which has a high concentration of filler, and which has never been produced by a conventional method.

We claim:

1. A particulate polycarbonate resin composition having a particle size distribution n of from 3 to 8 as represented by the Rosin-Rammler distribution equation:

$$R = 100 \exp(-b\, D_p^n)$$

wherein R is an on-sieve amount (% by weight), $D_p$ is a particle diameter (mm), and b is a constant, the particle diameter of the 50% on-sieve weight integration being from 0.5 to 6 mm, and the bulk density being from 0.1 to 0.7 g/ml, prepared by separating the resin particles from a solution of from 0.5 to 30% by weight of a polycarbonate resin in an organic solvent, said solution containing an inorganic filler, which is in contact with water, at a temperature lower than the melting point of the polycarbonate, the amount of water present being such that the concentration of filler containing particulate resin is at most 40%.

2. The composition according to claim 1, wherein the inorganic filler is a filler composed of a powdery or fibrous inorganic compound.

3. The composition according to claim 1, wherein the inorganic filler is carbon black.

4. The composition according to claim 1, wherein the inorganic filler is carbon fibers.

5. The composition according to claim 1, wherein the weight ratio of the inorganic filler to the polycarbonate is at most 95/5.

6. The composition according to claim 1, wherein the weight ratio of the inorganic filler to the polycarbonate is from 90/10 to 5/95.

7. The composition according to claim 1, wherein tHe bulk density of said particulate resin composition ranges from 0.2 to 0.5 g/ml.

8. The composition according to claim 1, wherein the resin concentration ranges from 2 to 20% by weight.

9. The composition according to claim 1, wherein concentration of filler containing particulate resin ranges from 0.1 to 30% by weight.

10. A process for producing a particulate polycarbonate resin composition, which comprises:
heating a methylene chloride solution of a polycarbonate resin containing an inorganic filler in contact with water under oil-in-water suspended state conditions, such the concentration of filler containing particulate resin is at most 40%, thereby evaporating methylene chloride from said solution.

11. The process according to claim 10, wherein the inorganic filler is a filler composed of a powdery or fibrous inorganic compound.

12. The process according to claim 10, wherein the inorganic filler is carbon black.

13. The process according to claim 10, wherein the inorganic filler is carbon fibers.

14. The process according to claim 10, wherein the concentration of the particulate polycarbonate resin composition in the organic solvent is from 0.5 to 30% by weight.

15. The process according to claim 10, wherein methylene chloride is evaporated at a temperature of from 40 to 60° C.

16. The process according to claim 10, wherein the concentration of filler containing particulate resin ranges from 0.1 to 30% by weight.

* * * * *